United States Patent
Wu et al.

(10) Patent No.: US 11,237,858 B2
(45) Date of Patent: Feb. 1, 2022

(54) SOFTWARE-DEFINED DATA CENTER, AND DEPLOYMENT METHOD FOR SERVICE CLUSTER THEREIN

(71) Applicant: HUAWEI TECHNOLOGIES CO., LTD., Guangdong (CN)

(72) Inventors: Jie Wu, Shenzhen (CN); Shaofu Zuo, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 129 days.

(21) Appl. No.: 16/021,009

(22) Filed: Jun. 27, 2018

(65) Prior Publication Data

US 2018/0307522 A1    Oct. 25, 2018

Related U.S. Application Data

(63) Continuation of application No. PCT/CN2015/100222, filed on Dec. 31, 2015.

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5083* (2013.01); *H04L 41/0886* (2013.01);
(Continued)

(58) Field of Classification Search
None
See application file for complete search history.

(56) References Cited

U.S. PATENT DOCUMENTS

| 6,772,226 B1 | 8/2004 | Bommareddy et al. |
| 8,767,737 B2 * | 7/2014 | Wang .................... H04L 61/103 370/392 |

(Continued)

FOREIGN PATENT DOCUMENTS

| CN | 101719082 A | 6/2010 |
| CN | 102025535 A | 4/2011 |

(Continued)

OTHER PUBLICATIONS

Wen-Kuei Hsieh et al., Load balancing virtual machines deployment mechanism in SDN open cloud platform. 2015 17th International Conference on Advanced Communication Technology (ICACT), Aug. 27, 2015, 7 pages.
(Continued)

*Primary Examiner* — Abu Zar Ghaffari
(74) *Attorney, Agent, or Firm* — Womble Bond Dickinson (US) LLP

(57) ABSTRACT

A software-defined data center, and a deployment method for a service cluster are described therein. An SDN controller manages a cluster by using a shared IP address. The SDN controller obtains an online virtual machine event that is sent by an edge switch accessed by a new online virtual machine; obtains a MAC address of the new online virtual machine, and identifies the new online virtual machine; then identifies whether an IP address of the new online virtual machine is a shared IP address; and if the IP address of the new online virtual machine is the shared IP address, deploys the new online virtual machine to a service cluster corresponding to the shared IP address. The SDN controller automatically completes creation, capacity expansion of the service cluster, so that no manual intervention from a tenant is required, and tenant experience is good.

18 Claims, 6 Drawing Sheets

(51) Int. Cl.
  *H04L 12/931* (2013.01)
  *H04L 29/12* (2006.01)
  *H04L 12/24* (2006.01)
  *H04L 12/26* (2006.01)

(52) U.S. Cl.
  CPC ...... *H04L 41/0893* (2013.01); *H04L 41/0896* (2013.01); *H04L 41/5054* (2013.01); *H04L 41/5067* (2013.01); *H04L 43/0811* (2013.01); *H04L 49/70* (2013.01); *H04L 61/103* (2013.01); *H04L 61/6022* (2013.01); *G06F 2009/4557* (2013.01); *G06F 2009/45595* (2013.01)

(56) References Cited

U.S. PATENT DOCUMENTS

| | | | |
|---|---|---|---|
| 9,128,622 B1* | 9/2015 | Yang | G06F 9/5077 |
| 9,223,596 B1* | 12/2015 | Araujo | G06F 9/45558 |
| 10,419,530 B2* | 9/2019 | Halpern | H04L 67/2809 |
| 10,530,657 B2* | 1/2020 | Brandwine | H04L 12/4645 |
| 10,594,562 B1* | 3/2020 | Rastogi | H04L 41/0896 |
| 10,838,942 B2* | 11/2020 | Basso | H04W 40/242 |
| 2005/0114507 A1 | 5/2005 | Tarui et al. | |
| 2007/0083672 A1 | 4/2007 | Shima et al. | |
| 2010/0189117 A1 | 7/2010 | Gowda et al. | |
| 2010/0257269 A1* | 10/2010 | Clark | G06F 9/5083 709/226 |
| 2011/0231508 A1* | 9/2011 | Torii | H04L 61/103 709/208 |
| 2013/0159487 A1 | 6/2013 | Patel et al. | |
| 2014/0098813 A1 | 4/2014 | Mishra et al. | |
| 2014/0283051 A1 | 9/2014 | Doron et al. | |
| 2014/0379927 A1 | 12/2014 | Patel et al. | |
| 2015/0067126 A1* | 3/2015 | Madani | H04L 41/0853 709/223 |
| 2015/0067677 A1* | 3/2015 | Naseh | G06F 9/45533 718/1 |
| 2015/0071289 A1 | 3/2015 | Shin et al. | |
| 2015/0124812 A1 | 5/2015 | Agarwal et al. | |
| 2015/0156122 A1* | 6/2015 | Singh | H04L 61/1511 370/235 |
| 2015/0172101 A1 | 6/2015 | Decusatis et al. | |
| 2015/0188772 A1* | 7/2015 | Gasparakis | H04L 43/08 709/224 |
| 2015/0229629 A1* | 8/2015 | Ishaya | H04L 63/0876 726/4 |
| 2015/0341377 A1 | 11/2015 | Kasturi et al. | |
| 2015/0350102 A1* | 12/2015 | Leon-Garcia | H04L 47/781 709/226 |
| 2016/0014039 A1* | 1/2016 | Reddy | G06F 8/61 709/224 |
| 2016/0065454 A1* | 3/2016 | Arumugam | H04L 45/64 370/389 |
| 2016/0119256 A1 | 4/2016 | Wang et al. | |
| 2016/0134527 A1 | 5/2016 | Kwak et al. | |
| 2016/0142474 A1 | 5/2016 | Itsumi et al. | |
| 2016/0330076 A1* | 11/2016 | Tiwari | H04L 41/0806 |
| 2016/0352865 A1 | 12/2016 | Gupta et al. | |
| 2016/0357610 A1* | 12/2016 | Bartfai-Walcott | G06F 9/5027 |
| 2017/0201573 A1 | 7/2017 | Yang | |
| 2017/0286158 A1* | 10/2017 | Dai | H04L 67/2814 |
| 2017/0353359 A1 | 12/2017 | Gasparakis | |
| 2018/0287902 A1 | 10/2018 | Chitalia et al. | |

FOREIGN PATENT DOCUMENTS

| | | | |
|---|---|---|---|
| CN | 103078965 A | | 5/2013 |
| CN | 102316001 B | * | 2/2014 |
| CN | 103763367 A | | 4/2014 |
| CN | 103795805 A | | 5/2014 |
| CN | 103825838 A | | 5/2014 |
| CN | 103905317 A | | 7/2014 |
| CN | 103905577 A | | 7/2014 |
| CN | 103973676 A | | 8/2014 |
| CN | 104243337 A | | 12/2014 |
| CN | 104253770 A | | 12/2014 |
| CN | 104301247 A | | 1/2015 |
| CN | 104468462 A | | 3/2015 |
| CN | 104486103 A | | 4/2015 |
| CN | 104506408 A | | 4/2015 |
| CN | 104618240 A | | 5/2015 |
| CN | 104753715 A | | 7/2015 |
| CN | 104767676 A | | 7/2015 |
| CN | 104853001 A | | 8/2015 |
| CN | 104871483 A | | 8/2015 |
| CN | 105207856 A | | 12/2015 |
| EP | 2940581 A1 | | 11/2015 |
| EP | 2940952 A1 | | 11/2015 |
| JP | 2004507169 A | | 3/2004 |
| JP | 2005151107 A | | 6/2005 |
| JP | 2007110240 A | | 4/2007 |
| JP | 2012039188 A | | 2/2012 |
| JP | 2013105308 A | | 5/2013 |
| JP | 2015002438 A | | 1/2015 |
| JP | 2015091106 A | | 5/2015 |
| WO | 2012098786 A1 | | 7/2012 |
| WO | 2014208538 A1 | | 12/2014 |
| WO | 2015037604 A1 | | 3/2015 |

OTHER PUBLICATIONS

Tao Wen et al.,"DB2 Deep Parsing: Advanced DBA and Developers",Retrieved from baike.baidu.com/item/DB2%E6%B7%B1%E5%BA%A6%E8%A7%A3%E6%9E%90,dated Jul. 31, 2009,total 3 pages.

* cited by examiner

SOFTWARE-DEFINED DATA CENTER, AND DEPLOYMENT METHOD FOR SERVICE CLUSTER THEREIN

CROSS-REFERENCE TO RELATED APPLICATIONS

This application is a continuation of International Application No. PCT/CN2015/100222, filed on Dec. 31, 2015, the disclosure of which is hereby incorporated by reference in its entirety.

TECHNICAL FIELD

The present disclosure relates to information technologies (IT), and in particular, to a software-defined data center and a deployment method for a service cluster therein.

BACKGROUND

Generally, there are three cloud deployment models: a public cloud (Public Cloud, which is owned and operated by some enterprises, so as to provide a quick access to a computing resource for another organization or an individual at an affordable price), a private cloud (Private Cloud, which is owned by a single enterprise or an individual), and a hybrid cloud (Hybrid Cloud, which is based on the private cloud and combined with a public cloud service at a strategic level). A virtual private cloud (Virtual Private Cloud, VPC) is a dynamic configuration pool that is established based on shared computing resources provided by the public cloud. VPCs in the public cloud are isolated from each other, and a tenant in the VPC may apply for various virtualized resources on demand. The tenant may directly connect the VPC to a public network by using a public IP address, or may connect the VPC to a conventional DC (Data Center, DC) by using a virtual private network (Virtual Private Cloud, VPN).

Software-defined networking (Software Defined Networking, SDN) is a network design concept that is put forward by the Clean Slate research group in Stanford University of the United States, and a core idea of the software-defined networking is to separate a control plane from a data plane of a network device, centralize a network control right, and provide an open programmable interface. An SDN controller shields a difference between bottom-layer physical forwarding devices by using a standard southbound interface, such as the well-known OpenFlow protocol, so as to implement resource virtualization, and provides a flexible northbound interface for an upper-layer service to perform network configuration and invoke a network resource on demand.

A data center established by using an SDN technology and a virtualization technology is referred to as a software-defined data center (Software Defined Data Center, SDDC), and a network of such a data center is a software-defined data center network (Software Defined Data Center Network, SDDCN).

In a conventional data center, multiple equivalent servers form one server cluster that may provide a service, so as to provide a user with an efficient, reliable, secure, and stable service. The server cluster equivalently shares service traffic among all servers by using a load balancing technology, and equally allocates requests to the servers in the server cluster, so as to implement load balancing among all the servers in the server cluster. In a current software-defined data center SDDC, a load balancer may be established in an SDDCN by using an existing technology, and the load balancer allocates a task to a serving node in the server cluster. However, a feature that a tenant in the SDDC can flexibly configure, in a VPC, a load balancer (for example, a virtual machine is used for implementation) cluster and a service cluster is not considered in this solution, thereby resulting in complex and inflexible configuration.

SUMMARY

Embodiments of the present disclosure provide a software-defined data center, and a deployment method, a scheduling method, a health check method, and a traffic monitoring method that are for a service cluster in the software-defined data center, so as to provide a service cluster management mode that is flexible and more suitable for a cloud environment.

According to a first aspect, this application provides a deployment method for a service cluster in a software-defined data center, where the service cluster includes multiple serving nodes that provide a same service, and, in this embodiment, a serving node is implemented by using an online virtual machine. The software-defined data center includes an SDN controller and multiple edge switches, where the multiple edge switches are communicatively connected to the SDN controller. Multiple static virtual machines are defined in the software-defined data center (for example, a virtual machine is configured with static configuration information but is offline), and each static virtual machine is configured with an IP address and a MAC address. IP addresses of static virtual machines that belong to a same service cluster are configured as a shared IP address. Specifically, the deployment method includes:

obtaining, by the SDN controller, a virtual machine go-online event that is sent by an edge switch accessed by a new online virtual machine; obtaining a MAC address of the new online virtual machine, performing matching between the MAC address of the new online virtual machine and an IP address of a candidate virtual machine selected from the multiple static virtual machines, and when a MAC address of the candidate virtual machine is the same as the MAC address of the new online virtual machine, determining that the candidate virtual machine is the new online virtual machine, and binding the first edge switch to the candidate virtual machine; identifying, by the SDN controller, whether an IP address of the new online virtual machine is a shared IP address; and if the IP address of the new online virtual machine is the shared IP address, deploying the new online virtual machine to a service cluster corresponding to the shared IP address.

According to the foregoing deployment method, the SDN controller manages the service cluster in a centralized manner. The SDN controller manages the service cluster by using a shared IP address, and can automatically identify a new online virtual machine when the virtual machine gets online, and expands a capacity of the service cluster or creates a service cluster based on automatic identification of the new online virtual machine and automatic identification of a service cluster to which the new online virtual machine belongs, so that the deployment method for the service cluster is flexible, no manual intervention from a tenant is required, and tenant experience is good.

In one implementation manner of the first aspect, before the obtaining, by the SDN controller, a MAC address of the new online virtual machine, the method further includes: selecting, by the SDN controller, the candidate virtual machine from the multiple static virtual machines; correspondingly, sending, by the SDN controller, an identification request message to the new online virtual machine by simulating a gateway of the candidate virtual machine, where the identification request message is used to instruct the new online virtual machine to report the MAC address of the new online virtual machine; and receiving, by the SDN controller, a response message that is of the identification request and that is sent by the new online virtual machine, and obtaining the MAC address of the new online virtual machine carried in the response message of the identification request.

Preferably, the identification request message is an Address Resolution Protocol ARP request packet, and the response message of the identification request is an ARP response packet; and a destination MAC address in an ARP packet part of the ARP request packet is padded with a special field, where the special field indicates that the destination MAC address is to be padded by a responding party.

In another implementation manner of the first aspect, the SDN controller receives an identification request message that is sent by the new online virtual machine and that is forwarded by the first edge switch, and obtains the MAC address of the new online virtual machine carried in the identification request message.

The SDN controller implements identification of the new online virtual machine by actively identifying the new online virtual machine or passively capturing the new online virtual machine, and this is a prerequisite for flexible deployment of the service cluster.

In another implementation manner of the first aspect, before the deploying, by the SDN controller, the new online virtual machine to a service cluster corresponding to the shared IP address, the method further includes: confirming whether the service cluster is created; and if the service cluster has not been created, creating the service cluster by using the shared IP address as an identifier.

In another implementation manner of the first aspect, the SDN controller determines whether an IP address of any online virtual machine included in the service cluster is invalid; and when determining that the IP address of any online virtual machine is invalid, deletes, from the service cluster, the online virtual machine with the invalid address.

Preferably, the SDN controller initiates a health check of the service cluster, and determines, according to a result of the health check, whether the IP address of any online virtual machine in the service cluster is invalid.

Based on the foregoing implementation, the SDN controller learns in time statuses of virtual machines in the service cluster, and reduces a capacity of the service cluster according to the statuses of the virtual machines, so that a to-be-processed service of the service cluster is not distributed to a serving node on which a problem occurs, thereby ensuring efficiency of service processing of the service cluster.

Preferably, the first aspect further provides three manners in which the SDN controller performs the health check of the service cluster, including:

receiving, by the SDN controller, a port status event sent by at least one edge switch, and determining a port whose interface status is abnormal according to the port status event, so as to determine that an IP address of an online virtual machine corresponding to the port whose interface status is abnormal is invalid; or periodically sending, by the SDN controller, a link status detection request to the online virtual machine in the service cluster, and monitoring whether a response message that is of the link status detection request and that is returned by the online virtual machine in the service cluster is received within a preset time, so as to determine that an IP address of an online virtual machine encountering response message timeout is invalid; or receiving, by the SDN controller, an aging forwarding flow table event sent by at least one edge switch, so as to determine that an IP address of an online virtual machine corresponding to an aging forwarding flow table is invalid.

According to the foregoing solution, the SDN controller performs the health check of the service cluster, so as to accurately learn in time a status of the service cluster.

According to a second aspect, this application provides a software-defined data center, where the software-defined data center includes an SDN controller and multiple edge switches, and the multiple edge switches are communicatively connected to the SDN controller; multiple static virtual machines are defined in the software-defined data center, each static virtual machine is configured with an IP address and a Media Access Control MAC address, and IP addresses of static virtual machines that belong to a same service cluster and that are in the multiple static virtual machines are configured as a shared IP address; and the multiple edge switches are configured to request packet forwarding information from the SDN controller, and forward a packet according to a forwarding flow table delivered by the SDN controller;

the virtual machine configured with the shared IP address is configured to: after accessing a network in the software-defined data center, join a service cluster corresponding to the shared IP address as an online virtual machine; and the SDN controller is configured to implement the deployment method for the service cluster according to the first aspect.

According to a third aspect, this application provides a computing device, including a processor, a memory, a bus, and a communications interface, where the memory is configured to store an executable instruction, the processor and the memory are connected by using the bus, and when the computing device runs, the processor executes the executable instruction stored in the memory, so that the apparatus performs the deployment method for the service cluster according to the first aspect.

Correspondingly, this embodiment further provides a corresponding computer-readable medium, which is configured to store the computer-executable instruction that enables a computer to execute any one of the service cluster deployment, scheduling, or traffic monitoring method.

According to this application, as a load balancer (LBer), an SDN controller may reuse a dynamic expansion capability of an SDN at a control layer, and reuse a network resource of the SDN network at a network forwarding layer, and this can be implemented easily and at a low cost; and then the SDN controller manages a cluster by using a shared IP address, and the SDN controller automatically completes creation, capacity expansion, capacity reduction, and deletion of the service cluster, so that no manual intervention from a tenant is required, and tenant experience is good.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure.

For ease of detailed description of the present disclosure, concepts involved in the present disclosure are first explained as follows:

Tenant network: a network established by a tenant in an SDDC. Generally, a tenant network is corresponds to a VPC.

Service cluster: a cluster consisting of serving nodes that provide a same service for a user.

Serving node and virtual machine: A serving node refers to a node that provides a service in a service cluster, and a virtual machine is a node obtained by means of virtualization in a cloud environment. In the embodiments of the present disclosure, the serving node is implemented by using the virtual machine, but not all virtual machines in an SDDC are configured to implement the serving node. There may be a virtual machine that executes another service.

Static virtual machine: a virtual machine that is configured with static configuration information by a cloud management platform. The virtual machine does not go online, that is, the virtual machine is not connected to an edge switch.

Online virtual machine: representing an activated status of a virtual machine. The online virtual machine can perform an operation and communicate with another associated device.

Virtual machine go-online: representing a related action or event that takes place when a virtual machine enters an activated state.

Shared IP address: Serving nodes that belong to a same service cluster are configured as a shared IP address. The shared IP address may be a same IP address, or may be a set of several different IP addresses. The set of the IP addresses is shared by the serving nodes in the service cluster. For example, an IP address of all serving nodes in a service cluster is configured as IP1, and the IP1 is a shared IP address. For another example, shared IP addresses in a service cluster are IP1 and IP2, and an IP address of a serving node in the service cluster may be configured as either the IP1 or the IP2.

Figure 1:
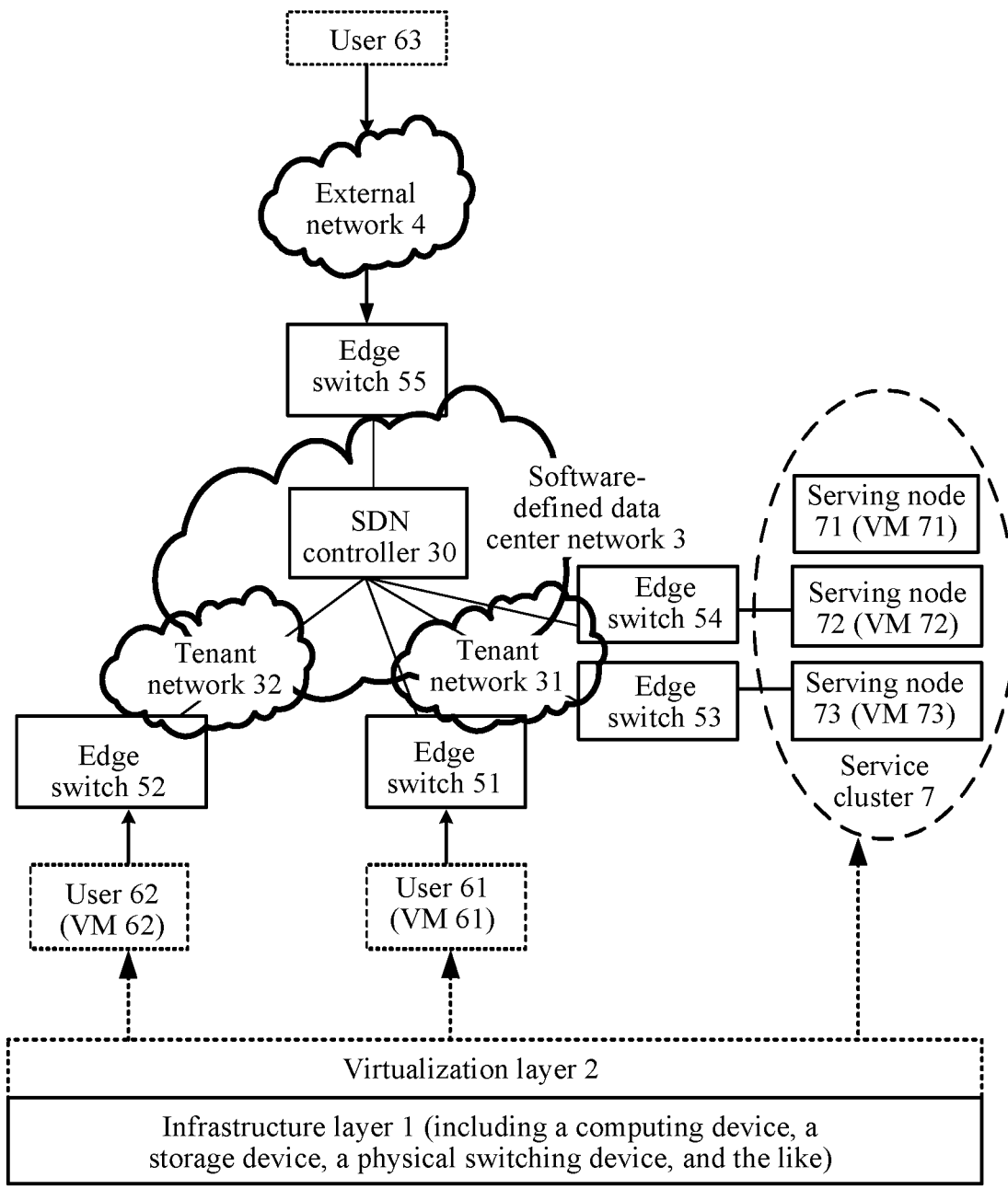
FIG. 1 is a schematic structural diagram of a software-defined data center according to an embodiment of the present disclosure.

FIG. 1 is a composition diagram of a cloud data center exemplified in the present disclosure. In FIG. 1, an infrastructure layer 1 includes a hardware facility that constitutes the cloud data center, such as a computing device, a storage device, a physical switching device, or the like. The hardware facility may be a dedicated device of a single type, or may be an integrated device integrating computing, storage, and switching. The physical switching devices in the infrastructure layer 1 form a network according to a specified architecture and form a network core area. Virtual switches may be virtualized in the network core area. The virtual switches form a network edge area beyond the network core area. Switching device in the core area and the edge area are interconnected to jointly constitute an SDDC infrastructure network. A resource at the infrastructure layer 1 may derive a virtual machine (Virtual Machine, virtual machine) after being virtualized by a virtualization layer 2. The virtual machine accesses the virtual switch so as to access a network. As shown in FIG. 1, a virtual machine 61, a virtual machine 62, a virtual machine 71, a virtual machine 72, and a virtual machine 73 are virtual machines, and edge switches 51, 52, 53, 54, and 55 are virtual switches.

The virtual switches form an SDDCN network. The SDDCN network is an SDN network, and includes an SDN controller 30. The edge switches 51-55 exchange a packet according to an instruction of the SDN controller 30. The SDN controller 30 may further customize multiple tenant networks (or may be referred to as VPC) on a set of network infrastructure, such as a tenant network 31 and a tenant network 32 in FIG. 1. All tenant networks are logically isolated from each other. Each tenant is allowed to deploy a virtual machine, install application software, and publish a service to a user in an exclusive tenant network. Considering availability and performance, the tenant is further allowed to perform multipoint deployment on the service and construct a service cluster, and all serving nodes provide a homogeneous service to the outside. As shown in FIG. 1, the tenant network 31 defines a service cluster 7. The SDDC network may also interwork with an external network, such as an external network 4 in FIG. 1. A user 63 connects to a user or a service in the SDDC by using the external network 4.

In a cloud environment, a carrier of an LB load balancer (Load Balancer, LBer) is a virtual machine. Monomer performance of each virtual machine is limited. To ensure a scheduling capability of load balancing in the tenant network VPC and meet a requirement of linear increase in the service cluster, generally multiple virtual machines are used to construct an LBer cluster. For a continuously adjusted LBer cluster, consistency and timeliness of synchronization between LBers may affect a go-online rate of the service. On the other hand, service cluster configuration in the cloud environment is flexible. The tenant may flexibly configure the service cluster at any time, and capacity expansion and capacity reduction are relatively frequent. Establishment, capacity expansion, capacity reduction, and deletion of the service cluster may generally require manual intervention of the tenant, and flexibility is poor.

To resolve the foregoing problems, this embodiment of the present disclosure provides a technical solution that an SDN controller, such as the SDN controller 30 in FIG. 1, is used to implement a scheduling and decision function of an LBer, and the SDN controller performs automated management on a service cluster according to a same IP address or a shared IP address of a serving node in a same service cluster. First, in this embodiment of the present disclosure, an LBer or an LBer cluster is not separately established, and the SDN controller is used to implement the scheduling and decision function of the LBer. Second, all nodes in the service cluster are configured as a shared IP address. The SDN controller captures an IP address conflict in a tenant network, identifies the shared IP address and manages the service cluster based on the shared IP address, and distinguishes different serving nodes in the service cluster by using a Media Access Control (Media Access Control, MAC) address. In addition, the SDN controller follows a serving node LB principle, and customizes a packet forwarding flow table to instruct a switch to direct user traffic to a specified serving node. The switch receives the forwarding flow table delivered by the SDN controller, and distributes traffic according to an instruction of the forwarding flow table.

As a core of the SDDCN network, the SDN controller is configured with a relatively strong capability. In this embodiment of the present disclosure, the SDN controller is used to implement the scheduling and decision function of the LBer. A dynamic expansion capability of the SDN may be multiplexed at a control layer, and a network resource of the SDN network may be multiplexed at a network forwarding layer. Implementation complexity is low, and investment costs are low. Besides, the SDN controller manages a cluster by using the shared IP address, the SDN controller automatically completes establishment, capacity expansion, capacity reduction, and deletion of the service cluster without requiring manual intervention of the tenant, and tenant experience is good. In addition, the SDN controller is used as the LBer, thereby avoiding a prior-art problem of a long forwarding path and low forwarding efficiency because user traffic is always routed to the LBer and then transferred or rerouted to a serving node when a separate LBer is used. The user traffic is distributed on an edge switch at an ingress of an SDN network, and the SDN controller selects an optimal path. A forwarding path is short, and forwarding efficiency is high.

The following describes in detail specific implementation details in this embodiment of the present disclosure with reference to specific implementation manners.

Service Cluster Deployment and Management

In this embodiment of the present disclosure, an SDN controller manages a service cluster, including establishment, capacity expansion, capacity reduction, and deletion of the service cluster. Service cluster management may further include health check of the service cluster.

Figure 2:
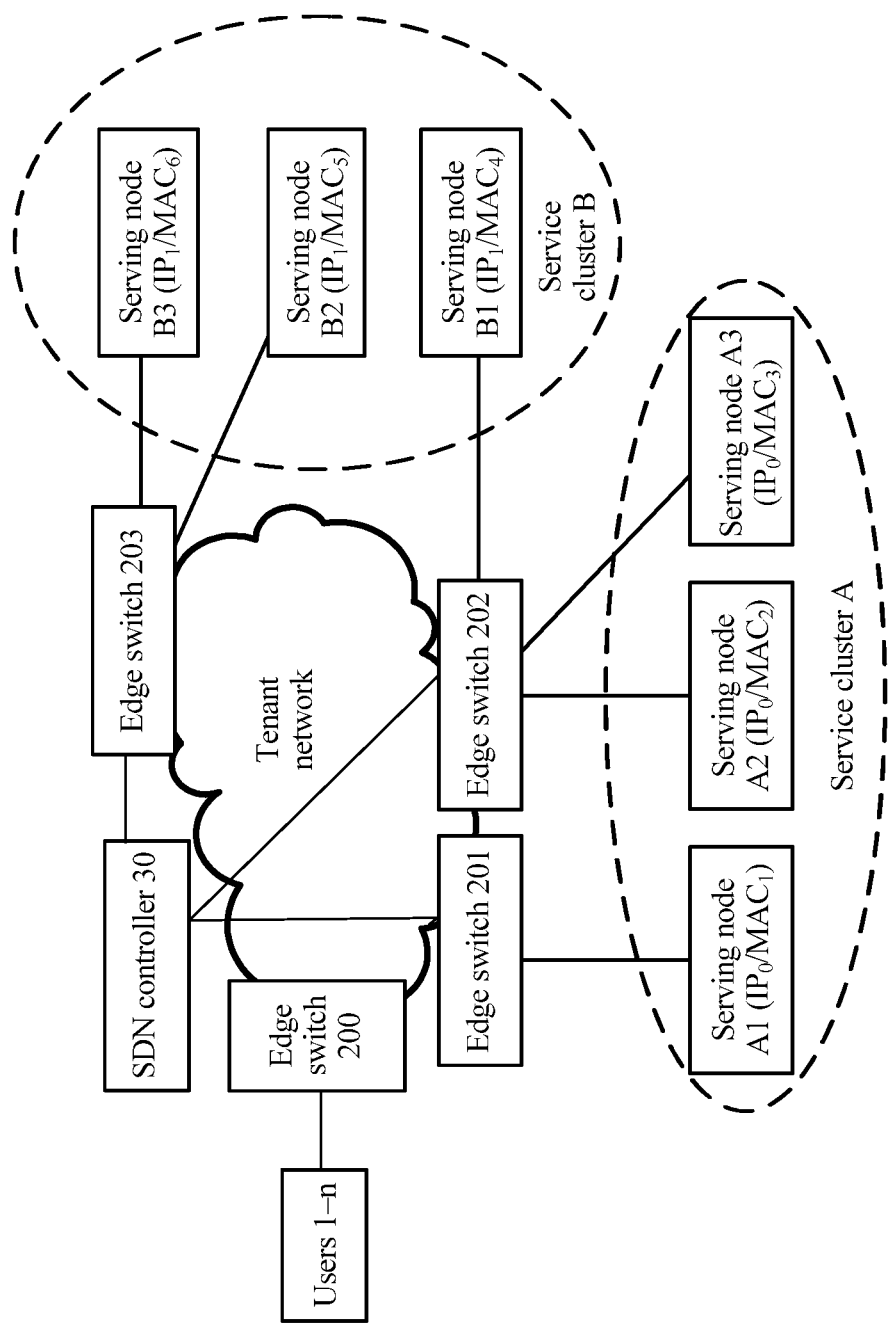
FIG. 2 is a schematic structural diagram of another software-defined data center according to an embodiment of the present disclosure.

Referring to FIG. 2 (an edge switch and a service cluster status configured by a tenant in FIG. 1 and in FIG. 2 are different, and this difference is used only to represent diversity of a tenant configuration status in specific implementation, but does not represent that FIG. 1 and FIG. 2 have an essential difference in system composition and method implementation), FIG. 2 shows a service cluster A and a service cluster B that are established by a same tenant. A shared IP address of the service cluster A is configured as $IP_0$, and a shared IP address of the service cluster A is configured as $IP_1$. It is assumed that the service cluster A configured by the tenant includes three serving nodes, an IP address and a MAC address of a serving node A1 are respectively ($IP_0$, $MAC_1$), an IP address and a MAC address of a serving node A2 are respectively ($IP_0$, $MAC_2$), and an IP address and a MAC address of a serving node A3 are respectively ($IP_0$, $MAC_3$). The service cluster B includes three serving nodes, an IP address and a MAC address of a serving node B1 are respectively ($IP_1$, $MAC_4$), an IP address and a MAC address of a serving node B2 are respectively ($IP_1$, $MAC_5$), and an IP address and a MAC address of a serving node B3 are respectively ($IP_1$, $MAC_6$).

An SDN controller 30 manages the service cluster of the tenant according to the shared IP address, identifies a serving node of the shared IP address in a tenant network, establishes the service cluster and expands a capacity of the service cluster based on the serving node of the shared IP address, regularly detects a health status of each node in the service cluster, and reduces a capacity of the service cluster or deletes the service cluster according to a health check result.

(1) Establishing a Service Cluster or Expanding a Capacity of the Service Cluster The SDN controller 30 adds a serving node (such as using a virtual machine) to the service cluster or establishes a new service cluster according to a serving node. It should be determined that the virtual machine has been online and running, because if a virtual machine that has not been online and running is added to the service cluster, and the virtual machine is configured to perform a task in the service cluster, but the virtual machine is not online, service processing of the service cluster is affected. Therefore, the SDN controller 30 should add, when it is determined that the virtual machine is online and running, a virtual machine that is online and running to the service cluster, or establish a new service cluster according to the virtual machine. In this embodiment of the present disclosure, the serving node is implemented by using a virtual machine in an SDDC. After taking over a network, the SDN controller 30 may obtain, from a cloud management platform, static configuration information of each static virtual machine in the SDDC, for example, information such as a tenant and a subnet to which each static virtual machine belongs, and a MAC address, an IP address, and a gateway that are of the virtual machine. However, the SDN controller 30 cannot know an actual running status of each static virtual machine, and cannot directly confirm whether the static virtual machine accesses an edge switch of a tenant network. This embodiment of the present disclosure provides a method used by the SDN controller 30 to identify an online virtual machine. After identifying the online virtual machine, the SDN controller 30 establishes a service cluster or adds the virtual machine to an established service cluster. Specifically, the SDN controller 30 obtains a virtual machine go-online event sent by an edge switch of a new online virtual machine. The SDN controller 30 obtains a MAC address of the new online virtual machine, matches the MAC address of the new online virtual machine with an IP address of a candidate virtual machine selected from multiple static virtual machines, determines the candidate virtual machine as the new online virtual machine when a MAC address of the candidate virtual machine is consistent with the MAC address of the new online virtual machine, and binds the edge switch of the new online virtual machine to the candidate virtual machine. The SDN controller 30 further identifies whether an IP address of the new online virtual machine is a shared IP address, and deploys the new online virtual machine to a service cluster corresponding to the shared IP address if the IP address of the new online virtual machine is the shared IP address.

In this embodiment of the present disclosure, the SDN controller 30 may identify the online virtual machine in either of two manners: active identification and passive capturing. Active identification by the SDN controller 30 may be that the SDN controller 30 actively sends, after knowing that a virtual machine recently goes online in an edge switch, an identification request message to the new online virtual machine to obtain a MAC address of the virtual machine so as to identify the new online virtual machine. Passive capturing by the SDN controller 30 may be that the SDN controller 30 checks the MAC address of the new online virtual machine to identify the new online virtual machine.

Figure 3:
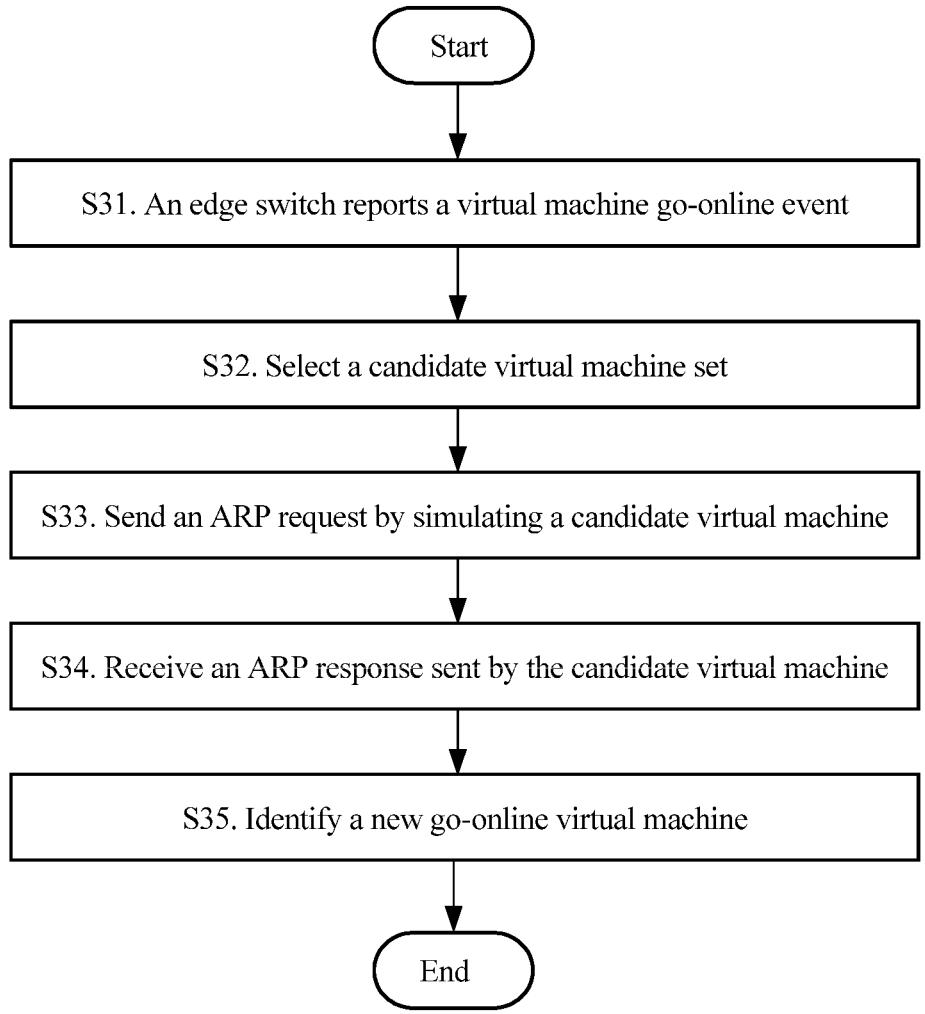
FIG. 3 is a schematic flowchart of identifying a new online virtual machine according to an embodiment of the present disclosure.

FIG. 3 is an implementation flowchart of actively identifying a virtual machine by an SDN controller 30 (a serving node is implemented by using the virtual machine). S31. When a new online virtual machine is connected to a first edge switch (the new online virtual machine is any one of multiple virtual machines configured for a tenant in a current SDDC, and the first edge switch is an edge switch that establishes a connection to the new online virtual machine and that is of multiple edge switches in the SDDC network), the SDN controller 30 receives a virtual machine go-online event sent by the first edge switch, such as an interface UP event.

S32. The SDN controller 30 selects a candidate virtual machine.

After receiving an interface reporting event of the first edge switch, the SDN controller 30 determines that a virtual machine go-online event occurs, and should further determine which one of multiple statically configured virtual machines whose static configuration information is stored in the SDN controller 30 is the new online virtual machine. In this embodiment, the SDN controller 30 first selects the candidate virtual machine from the statically configured virtual machines whose the static configuration information is stored in the SDN controller 30 (the candidate virtual machine selected by the SDN controller 30 constitutes a candidate virtual machine set, the candidate virtual machine set includes one or at least two candidate virtual machines, and this embodiment of the present disclosure provides a special scenario in which the candidate virtual machine set may include one candidate virtual machine). A purpose of selecting the candidate virtual machine is to verify whether the candidate virtual machine is the new online virtual machine. To ensure accuracy of verification, a range of the selected candidate virtual machine set may be all the statically configured virtual machines on the SDN controller. The selected candidate virtual machine may further be filtered, for example, a virtual machine that is bound to a specific edge switch is removed from all the statically configured virtual machines. A specific selection manner is: the SDN controller 30 first determines a set of statically configured virtual machines that are not bound to the specific edge switch, and selects the statically configured virtual machines in the determined set one by one until the SDN controller 30 completes identification on the new online virtual machine.

S33. The SDN controller 30 simulates a gateway of the candidate virtual machine to send an identification request message to the new online virtual machine, where the identification request message is used to instruct the new online virtual machine to report its MAC address.

One specific implementation manner of the identification request message is using an Address Resolution Protocol (Address Resolution Protocol, ARP) request. The ARP request is sent by the SDN controller 30 by simulating the gateway of the candidate virtual machine. A purpose of the ARP request is to request the candidate virtual machine to report its Media Access Control (Media Access Control, MAC) address.

Figure 4:
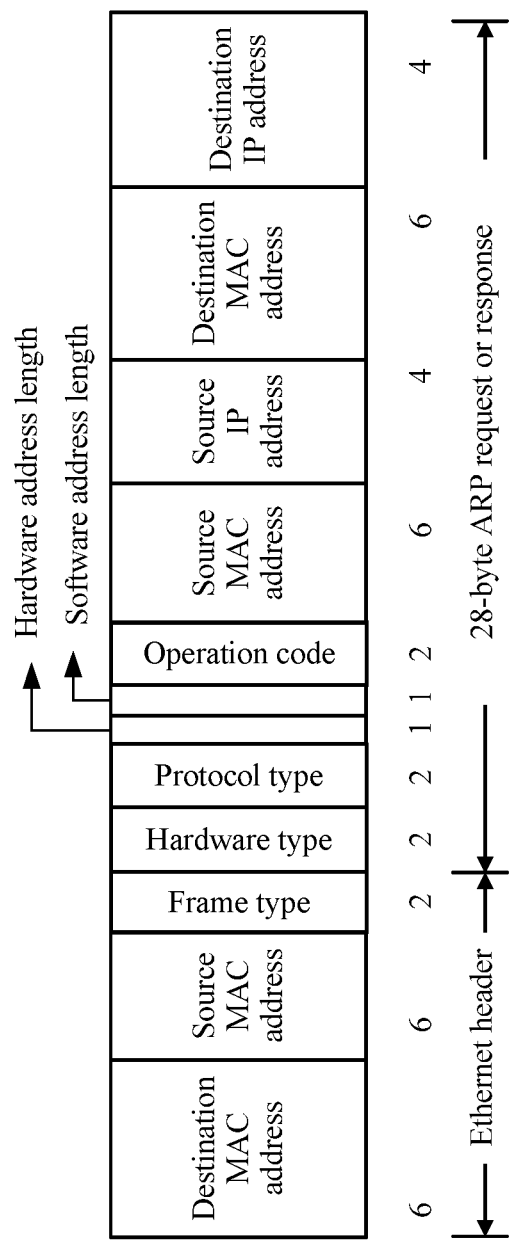
FIG. 4 is a schematic diagram of format composition of an ARP packet according to an embodiment of the present disclosure.

FIG. 4 is a schematic diagram of format composition of an ARP packet based on the Ethernet. An ARP data packet includes two parts: A first part is an Ethernet header, and a second part is an APR request/response part. In this embodiment, a destination MAC address in an Ethernet header of an ARP request packet constructed by the SDN controller 30 by simulating the gateway of the candidate virtual machine is filled with FF:FF:FF:FF:FF:FF, representing that an ARP packet is sent in a form of broadcasting. A source MAC address in the Ethernet header of the ARP request packet is filled with a MAC address of the gateway of the candidate virtual machine, representing that a first hop of the ARP request packet is sent via the gateway of the candidate virtual machine. A source IP address and a source MAC address of an APR request part of the ARP request packet are respectively filled with an IP address and a MAC address of the gateway of the candidate virtual machine, representing that the ARP request packet is generated and sent by the gateway of the candidate virtual machine. A destination IP address of the APR request part of the ARP request packet is filled with an IP address of the candidate virtual machine. A destination MAC address of the APR request part of the ARP request packet is filled with a special field, such as 00:00:00:00:00:00, representing that the destination MAC address is to be filled by a responder.

The SDN controller 30 constructs one ARP request packet for each candidate virtual machine in the candidate virtual machine set, and each ARP request packet corresponds to each candidate virtual machine. In this block, the SDN controller may traverse the statically configured virtual machines one by one, construct one ARP request packet when one candidate virtual machine is determined, and send the constructed ARP request packet, or may construct an ARP request packet for each candidate virtual machine after all candidate virtual machines are selected, and simultaneously send the constructed multiple ARP request packets. The foregoing two specific implementation manners are both applicable to this embodiment of the present disclosure.

S34. The SDN controller 30 receives an identification request response message sent by the new online virtual machine, where the identification request response message carries a MAC address of the new online virtual machine.

Specifically, the SDN controller 30 receives a PacketIn event reported by the first edge switch, and parses a packet to obtain an ARP response packet.

S35. The SDN controller 30 checks whether a source MAC address in the ARP response packet is consistent with a MAC address in static configuration information of the candidate virtual machine. If the source MAC address in the ARP response packet is consistent with the MAC address in the static configuration information of the candidate virtual machine, the new online virtual machine is identified by the SDN controller 30, the candidate virtual machine matches a new online virtual machine that sends an ARP response, and the first edge switch is bound to the candidate virtual machine.

Specifically, information about the first edge switch is recorded into the static configuration information of the determined candidate virtual machine.

In this embodiment, an asynchronous mode may be used in S33, S34, and S35. That is, in S33, after the candidate virtual machine is selected, the ARP request packet is sent for the selected candidate virtual machine; in S34, after the ARP response packet is received, it cannot be determined that the previously sent ARP request response packet is for which candidate virtual machine; in this case, in S35, the candidate virtual machines in the candidate virtual machine set may be checked one by one.

In addition to the implementation manner of actively identifying a new online serving node, the SDN controller 30 may further identify the new online serving node in a manner of passive capturing. After receiving an identification request message that is sent by the new online virtual machine and that is forwarded by an edge switch, the SDN controller 30 detects consistency between a MAC address of the new online virtual machine carried by the identification request message and a MAC address of the candidate virtual machine, so as to identify the new online virtual machine. The identification request message sent by the new online virtual machine may also be an ARP request packet (including a free ARP request). The SDN controller 30 determines, according to the received ARP request packet, a virtual machine that sends an ARP request as the new online virtual machine, and further checks consistency between a source MAC of the ARP request and a MAC of the static configuration information of the candidate virtual machine. If the source MAC of the ARP request is consistent with the MAC of the static configuration information of the candidate virtual machine, it is determined that the new online virtual machine matches the candidate virtual machine, the new online virtual machine is identified by the SDN controller 30, and an edge switch of the new online virtual machine is bound to the candidate virtual machine.

After the SDN controller 30 identifies the new online virtual machine, the SDN controller 30 checks whether an IP address of the new online virtual machine and an IP address of another virtual machine of a tenant are the same (or checks whether an IP address of the new online virtual machine and a preset shared IP address of the service cluster are the same). If the IP address of the new online virtual machine and the IP address of the another virtual machine of the tenant are the same, the SDN controller 30 checks whether the IP address of the new online virtual machine corresponds to an established service cluster. If the IP address of the new online virtual machine corresponds to the established service cluster, the SDN controller 30 adds the new online virtual machine to the established service cluster. If the IP address of the new online virtual machine does not have a corresponding established service cluster, a new service cluster is established by using the IP address of the new online virtual machine as an identifier, and the new online virtual machine is deployed into the newly established service cluster. The SDN controller 30 may also check whether an IP address of the new online virtual machine and a preset shared IP address of the service cluster are the same. If the IP address of the new online virtual machine and the preset shared IP address of the service cluster are the same, the SDN controller 30 adds the new online virtual machine to an established service cluster corresponding to the shared IP address, or establishes a new service cluster by using the shared IP address as an identifier, and adds the new online virtual machine to the established service cluster.

In this embodiment of the present disclosure, the SDN controller 30 establishes a service cluster for multiple virtual machines that are configured with a shared IP address to share all user access traffic. As shown in FIG. 2, the tenant network has two service clusters. The serving node A1, the serving node A2, and the serving node A3 share the IP address $IP_0$, and the MAC addresses are respectively $MAC_1$, $MAC_2$, and $MAC_3$; the serving node B1, the serving node B2, and the serving node B3 share the IP address $IP_1$, and the MAC addresses are respectively $MAC_4$, $MAC_5$, and $MAC_6$. Because the tenant network allows overlapping, in the SDDCN, the SDN controller 30 may uniquely identify a service cluster by using a combination of a tenant and an IP.

The foregoing virtual machine go-online not only includes a scenario in which a newly established virtual machine starts to run, but also includes another scenario of triggering a new IP address of a virtual machine to be effective, such as newly adding a virtual machine or changing an IP address.

(2) Deleting a Service Cluster or Reducing a Capacity of the Service Cluster

The service cluster is dynamically scalable. When the SDN controller detects that a virtual machine configured with a shared IP goes online in the tenant network, the SDN controller expands a capacity of a service cluster corresponding to a specified IP address; when the SDN controller discovers that a service cluster capacity reduction event occurs, the SDN controller reduces a capacity of the service cluster.

A serving node or another management node may notify the SDN controller 30 of the service cluster capacity reduction event, or the SDN controller 30 may actively detect and discover the service cluster capacity reduction event, such as health check of the service cluster initiated by using the SDN controller. The service cluster capacity reduction event may include IP address failure of the serving node. When the serving node is implemented by using the virtual machine, IP address failure of the serving node may be any condition such as virtual machine go-offline, changing, fault, or IP address deletion.

When it is determined that the IP address of the virtual machine fails, the SDN controller 30 checks whether the IP address of the virtual machine in a failed condition corresponds to the service cluster. If the IP address of the virtual machine in a failed condition corresponds to the service cluster, the SDN controller 30 deletes a failed virtual machine from a service cluster corresponding to the IP address of the failed virtual machine, and checks whether a quantity of remaining serving nodes of the service cluster is greater than 1. If the quantity of remaining serving nodes of the service cluster is less than or equal to 1, the service cluster corresponding to the IP address is deleted.

(3) Health Check on a Service Cluster

In this embodiment of the present disclosure, the SDN controller 30 may actively detect whether a server capacity reduction event occurs. For example, the SDN controller 30 regularly performs health check on the serving node in the service cluster, and invalidates an original IP address of a serving node whose health status does not meet a requirement, so as to delete the faulty serving node from the service cluster in a timely manner and ensure that subsequent access traffic is not directed to the faulty serving node, thereby ensuring high availability of a tenant service. In this embodiment, the SDN controller 30 may check a health status of the serving node in the service cluster from different network levels in any one of or a combination of three manners of port status monitoring, link status detection, or flow table monitoring, and determine, according to a health check result, whether an IP address of any online virtual machine of the service cluster fails.

Port status monitoring: The manner of port status monitoring is generally used to detect a serving node physical layer fault. The SDN controller 30 may configure port status monitoring logic on each edge switch by using a real-time command or static configuration of an administrator, so that each edge switch in the SDDCN detects an interface status of each serving node in the service cluster in real time. When an interface status of any serving node changes, a port status (PortStatus) event is reported to the SDN controller 30. For example, power-off, restart, an interface fault, or shutdown of a virtual machine that is used as a serving node may trigger an interface status of the virtual machine to be changed from go-online (UP) to go-offline (DOWN). The SDN controller 30 receives a port status event PortStatus (such as virtual machine interface go-offline) sent by at least one edge switch, determines a port with an abnormal interface status according to the port status event, and determines that an IP address of an online virtual machine corresponding to the port with the abnormal interface status fails.

Link status detection: The manner of link status detection is generally used to detect a serving node link layer fault. The SDN controller 30 simulates a gateway of each serving node in the service cluster, periodically constructs a link status detection request message, such as constructing an ARP request according to the IP address of the virtual machine, and sends a packet PacketOut of the constructed ARP request to an edge switch corresponding to the virtual machine. If the serving node does not respond in a timely manner after receiving the ARP request, an ARP response may expire. When a quantity of expiry times exceeds a preset threshold, the SDN controller 30 marks a destination IP address (that is, the IP address of the virtual machine) of an expired ARP request as a failed state.

Flow table monitoring: The manner of flow table monitoring is generally used to detect a serving node network-layer and transport layer fault. The SDN controller 30 delivers a forwarding flow table to each edge switch, so as to forward a service request of a user and a service response of a serving node. The edge switch is configured as detecting idle time of the forwarding flow table in real time. When the forwarding flow table does not match any packet, the idle time accumulates continuously. When the idle time is up to aging time, the edge switch deletes the forwarding flow table, and reports a forwarding flow table aging event to the SDN controller 30, such as a flow table removed Flow-Removed or a flow table expiry (Flow Expiry) event. After receiving the FlowRemoved(Expiry) event, the SDN controller 30 marks an IP address of a virtual machine corresponding to the flow table removed or the flow table expiry event as a failed state.

After determining, by performing health check in any one of the foregoing three manners, that an IP address of a virtual machine fails, the SDN controller 30 may delete the virtual machine with the failed IP address from the service cluster according to the foregoing operation process of capacity reduction or deletion of a service cluster.

Performing LB Traffic Distribution by an SDN Controller

After the SDN controller 30 establishes the service cluster or newly adds a serving node to the service cluster, the SDN controller 30 may distribute traffic for the serving node in the service cluster according to a load balancing principle. As shown in FIG. 2, a service request of a user 1 is directed into the tenant network by using an edge switch 200 on a user side, crosses the network core area after being directed by the SDN controller 30, is directed out of the tenant network by using an edge switch 201 on a service side, and finally flows into the serving node A1 in the service cluster A. On the contrary, a service response of the serving node A1 is directed into the tenant network by using the edge switch 201, crosses the network core area after being directed by the SDN controller 30, is directed out of the tenant network by using the edge switch 200, and finally flows into the user 1. In an entire forwarding process, the SDN controller 30 should control the edge switch, customize and deliver the forwarding flow table for the edge switch, match packet source and destination information, encapsulate a forwarding path into the packet and forward the packet.

Figure 5:
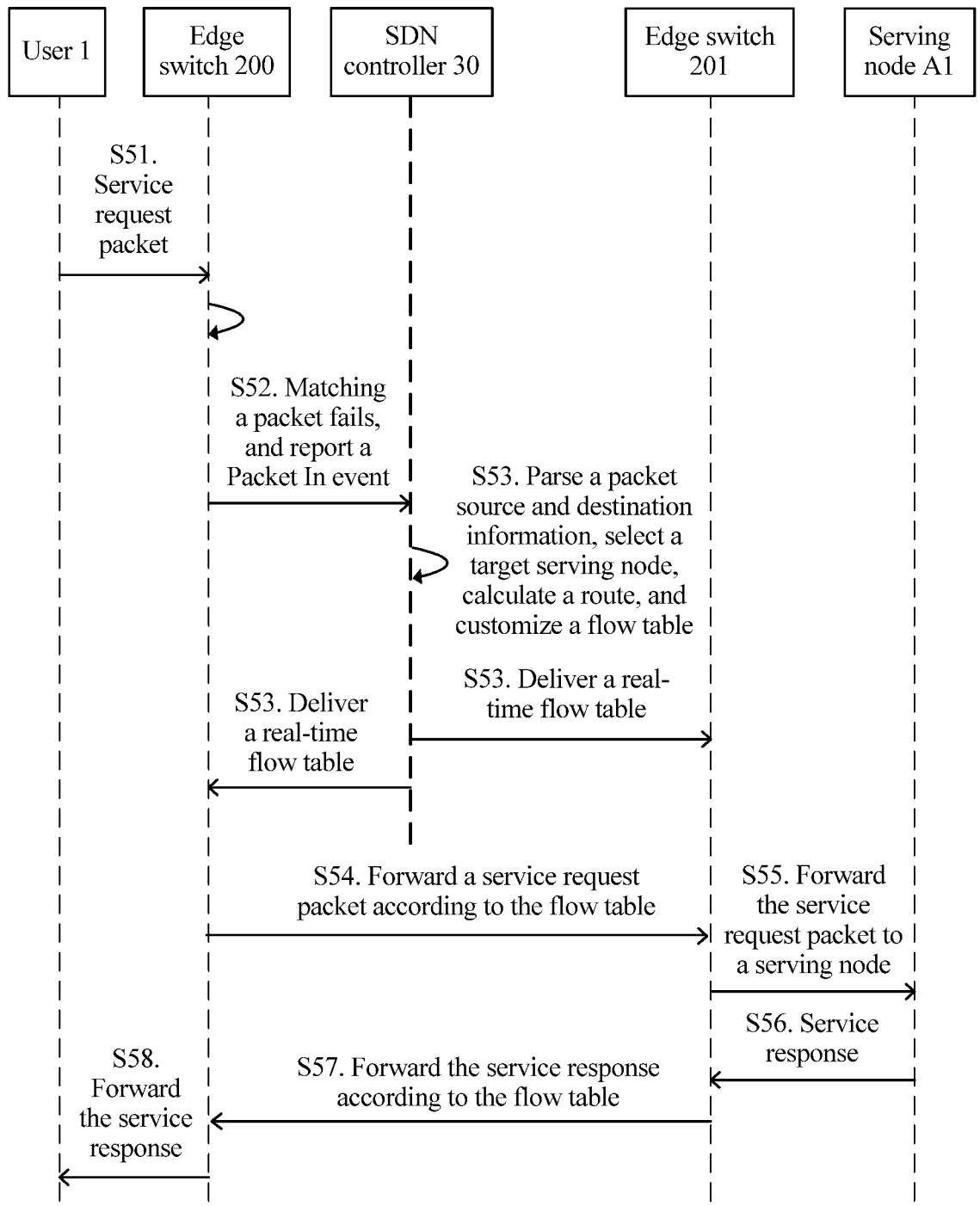
FIG. 5 is a schematic flowchart of service cluster traffic distribution according to an embodiment of the present disclosure.

With reference to the data center in FIG. 2, FIG. 5 is a flowchart of user traffic distribution. Specific blocks are as follows:

S51. The user 1 requests the serving node in the service cluster to provide a service, and a service request packet of the user 1 is passed to the edge switch 200 of the user 1.

S52. The edge switch 200 of the user finds no matched forwarding flow table after receiving the service request packet, reports a PacketIn event to the SDN controller 30 to request the SDN controller 30 to deliver routing information.

S53. The SDN controller 30 parses a packet source and destination information of the service request packet, determines a service cluster corresponding to the service request packet according to destination IP address information of the service request packet, selects the serving node A1 in the service cluster A as a target serving node according to a preset load balancing policy, calculates forwarding information between the user 1 and the edge switch 201 of the serving node A1, generates respective forwarding flow tables of the edge switch 201 and the edge switch 200 according to the determined forwarding information, and respectively delivers the respective forwarding flow tables to the edge switch 201 of the serving node A1 and the edge switch 200 of the user 1.

The SDN controller 30 generates respective forwarding flow tables respectively corresponding to the user 1 and the serving node A1, and respectively delivers the forwarding flow tables to the edge switch 200 and the edge switch 201. The SDN controller 30 may simultaneously deliver the flow tables, or may first deliver the forwarding flow table of the edge switch 201, or may first deliver the forwarding flow table of the edge switch 200. First delivering the forwarding flow table to the edge switch 201 is mainly to ensure that the edge switch 201 of the serving node A1 has an available forwarding flow table before the packet arrives, and prevent the edge switch 201 of the serving node A1 from reporting the PacketIn event to the SDN controller 30. End-to-end communication is always mutual. The forwarding flow tables delivered by the SDN controller 30 to the edge switch 200 and the edge switch 201 include two directions of forward and reverse, a forward flow table is applicable to forwarding a request of the user 1 to the serving node A1, and a reverse flow table is applicable to forwarding the service response of the serving node A1 to the user 1.

S54. The edge switch 200 forwards the service request packet to the edge switch 201 of the serving node A1 according to the forwarding flow table delivered by the SDN controller.

S55. The edge switch 201 of the serving node A1 forwards the service request packet to the serving node A1. As an edge switch, the edge switch 201 of the serving node A1 should forward a packet according to a destination MAC address in the packet if an access host is definite.

S56. The serving node A1 responds to the request of the user 1, and sends a service response to the edge switch 201 of the serving node A1.

S57. The edge switch 201 of the serving node A1 forwards the service response according to the forwarding flow table delivered by the SDN controller 30, and forwards a service response packet to the edge switch 200 of the user 1.

S58. The edge switch 200 of the user 1 forwards the service response to the user 1. The edge switch 200 of the user 1 should forward the packet according to the destination MAC address in the packet if the access host is definite.

TABLE 1

Example of a flow table delivered by an SDN controller

| Edge switch | Forward flow entry | Reverse flow entry |
| --- | --- | --- |
| Edge switch 200 | Matching condition: source IP = IP11 (IP of User 1), destination IP = IP0 Execution action: encapsulate a forwarding path to the edge switch 201, and send a packet to an ingress of a core network | Matching condition: destination MAC = MAC11 (destination MAC of User 1) Execution action: send a packet to User 1 |
| Edge switch 201 | Matching condition: destination MAC = MAC1 Execution action: send a packet to the serving node A1 | Matching condition: destination IP = IP11 (IP of User 1) Execution action: encapsulate a forwarding path to the edge switch 200, and send a packet to an ingress of a core network |

The foregoing table lists a forwarding flow table customized and delivered by the SDN controller for a related edge switch in an interaction process between the user 1 and the serving node A1. For the request of the user 1, the edge switch 200 matches a packet source IP11 and a destination IP0, encapsulates a forwarding path to the edge switch 200 into the packet, and send the packet to an ingress of a core network. If IP11 and IP0 belong to a same network segment, a destination MAC address of the packet is directly filled with a MAC address $MAC_1$ of the serving node A1, and this does not change. If IP11 and IP0 are not in a same network segment, a destination MAC address of the packet is filled with a gateway MAC address of the serving node A1. The edge switch 201 should change the destination MAC address of the packet into the MAC address $MAC_1$ of the serving node A1. The edge switch 201 matches the packet destination $MAC_1$, and sends the packet to the serving node A1. For the response of the serving node A1, the edge switch 201 matches the packet destination IP11, encapsulates the forwarding path to the edge switch 200 into the packet, and sends the packet to the ingress of the core network. The edge switch 200 performs matching on the packet destination MAC11, and sends the packet to the user 1.

A subsequent forwarding process of a service request and a service response between the user 1 and the serving node A11 is similar to a forwarding process of a service request first packet and a service response first packet.

The foregoing solution describes how the SDN controller 30 initially distributes serving nodes for a first packet of a user according to a load balancing principle. In an actual service, there is another scenario of traffic distribution. When the serving node of the service cluster encounters a fault, the SDN controller 30 cannot direct new online user traffic to the faulty serving node, and further should redirect user traffic that is directed into the faulty serving node to another normal serving node in the service cluster. The SDN controller 30 should delete, in a timely manner, a delivered forwarding flow table that is on an edge switch and that corresponds to the user and the serving node, re-specify a new serving node for the user traffic according to a user traffic distribution process, and deliver a new forwarding flow table.

Load Monitoring on a Serving Node in a Service Cluster

In this embodiment of the present disclosure, as an LBer, the SDN controller 30 follows a serving node LB principle, and customizes a packet forwarding flow table to instruct an edge switch to direct user traffic to a specified serving node.

The SDN controller 30 may monitor load of the serving node in the service cluster, execute a load balancing function of the LBer according to a load monitoring result, and select a target virtual machine. A common practice of load monitoring is: the SDN controller 30 may monitor a resource usage status of each serving node, such as monitoring a usage status of any resource of CPU resource utilization, memory utilization, cache utilization, hard disk utilization, bandwidth utilization of each serving node, or any combination of these resources. In this embodiment of the present disclosure, to implement load balancing by the SDN controller 30, in addition to making a load balancing decision according to the resource usage status of the serving node in the prior art, a new implementation manner is further provided. The SDN controller 30 performs load balancing scheduling based on a load balancing principle of serving node traffic, and customizes a corresponding forwarding flow table to instruct an edge switch to distribute traffic.

The SDN controller 30 performs resource load monitoring or traffic load monitoring on an online virtual machine in the service cluster, and periodically obtains, from a load monitoring result, resource load information or traffic load information of each online virtual machine in the service cluster. The SDN controller 30 selects a virtual machine with minimum resource load or minimum traffic load as a target virtual machine after obtaining resource load information or traffic load information of each online virtual machine in the service cluster.

The SDN controller 30 may instruct, when delivering a forwarding flow table to each edge switch, each edge switch to monitor traffic for each forwarding flow table, or a system may configure a logic on each edge switch that each edge switch monitors traffic for each forwarding flow table. The edge switch in the SDDC network forwards the service request of the user and the service response of the serving node according to the forwarding flow table delivered by the SDN controller 30, and statistically collects, in real time, a quantity or a length of packets accumulatively processed by each forwarding flow table. The quantity of packets accumulatively processed by the service response of the serving node on the edge switch of the serving node represents a user request quantity responded by the serving node, and indirectly reflects load of the serving node. The SDN controller 30 periodically collects, from the edge switch of the serving node, a traffic statistics result of each forwarding flow table statistically collected by the edge switch, filters service response traffic data from a traffic statistics result of each forwarding flow table, so as to implement monitoring of traffic load of the serving node.

As shown in FIG. 2, the service cluster B in the tenant network has three serving nodes B1, B2, and B3, which share one IP address IP1. Five users in total request a service from the service cluster. The user 1 and a user 4 are served by the serving node B1, a user 2 and a user 5 are served by the serving node B2, and a user 3 is served by the serving node B3. An edge switch of each serving node forwards and statistically collects a service request and a response packet, and records statistics data into a statistics field of a related forwarding flow table. The SDN controller periodically or regularly delivers a traffic statistics data extraction request of the forwarding flow table, and obtains, after receiving an extraction request response, a quantity of packets accumulatively processed by the service response. With reference to historical sampling data, service traffic provided by a specified serving node for a user in a specific period can be calculated, and load of the serving node is determined according to the service traffic.

TABLE 2

Traffic data statistically collected by an edge switch

| Edge switch | Traffic statistics data of a service response of a flow table at a moment T1 | Traffic statistics data of a service response of a flow table at a moment T2 |
|---|---|---|
| Edge switch 202 | Serving node B1 to User 1: n_packets = N11<br>Serving node B1 to User 4: n_packets = N14 | Serving node B1 to User 1: n_packets = N11 + $\Delta$N11<br>Serving node B1 to User 4: n_packets = N14 + $\Delta$N14 |
| Edge switch 203 | Serving node B2 to User 2: n_packets = N22<br>Serving node B2 to User 3: n_packets = N33<br>Serving node B2 to User 5: n_packets = N25 | Serving node B2 to User 2: n_packets = N22 + $\Delta$N22<br>Serving node B2 to User 3: n_packets = N33 + $\Delta$N33<br>Serving node B2 to User 5: n_packets = N25 + $\Delta$N25 |

The SDN controller collects traffic statistics data on the edge switch according to a time period. Table 2 lists traffic statistics data corresponding to service responses of different forwarding flow tables on each edge switch at different moments. The serving node B1 separately processes N11 and N14 packets for service response flow tables of the user 1 and the user 4 at the moment T1, and separately processes N11+$\Delta$N11 and N14+$\Delta$N14 packets at the moment T2. The serving node B2 separately processes N22 and N25 packets for service response flow tables of the user 2 and the user 5 at the moment T1, and separately processes N22+$\Delta$N22 and N25+$\Delta$N25 packets at the moment T2. The serving node B2 processes N33 packets for a service response flow table of the user 3 at the moment T1, and processes N33+$\Delta$N33 packets at the moment T2.

The SDN controller 30 sums up an increased quantity of packets processed by each serving node for service response flow tables of different users in the sampling period so as to obtain load of a specified serving node in a period of time.

TABLE 3

Traffic load of a serving node in a period T

| Serving node | Node traffic load in a period T (unit: packets) |
|---|---|
| Serving node 1 | $\Delta$N11 + $\Delta$N14 |
| Serving node 2 | $\Delta$N22 + $\Delta$N25 |
| Serving node 3 | $\Delta$N33 |

Table 3 lists node load of each serving node in the period T calculated by the SDN controller. Node load of the serving node B1 in the period T is $\Delta$N11+$\Delta$N14, node load of the serving node B2 in the period T is $\Delta$N22+$\Delta$N25, and node load of the serving node B3 in the period T is $\Delta$N33.

Persons of ordinary skill in the art may understand that all or some of the actions or operations of the embodiments may be implemented by hardware or a program instructing related hardware. The program may be stored in a computer-readable storage medium. The storage medium may include: a read-only memory, a magnetic disk, or an optical disc.

The SDN controller in this embodiment of the present disclosure may be implemented by using a software component/program, or a hardware module, such as a specific circuit module. If the SDN controller is implemented by using a software component, the software component may run on a computer device, or may be stored in a media medium. The computer device that loads the software component or the media medium that stores the software component also pertains to specific implementation of this embodiment of the present disclosure.

Figure 6:
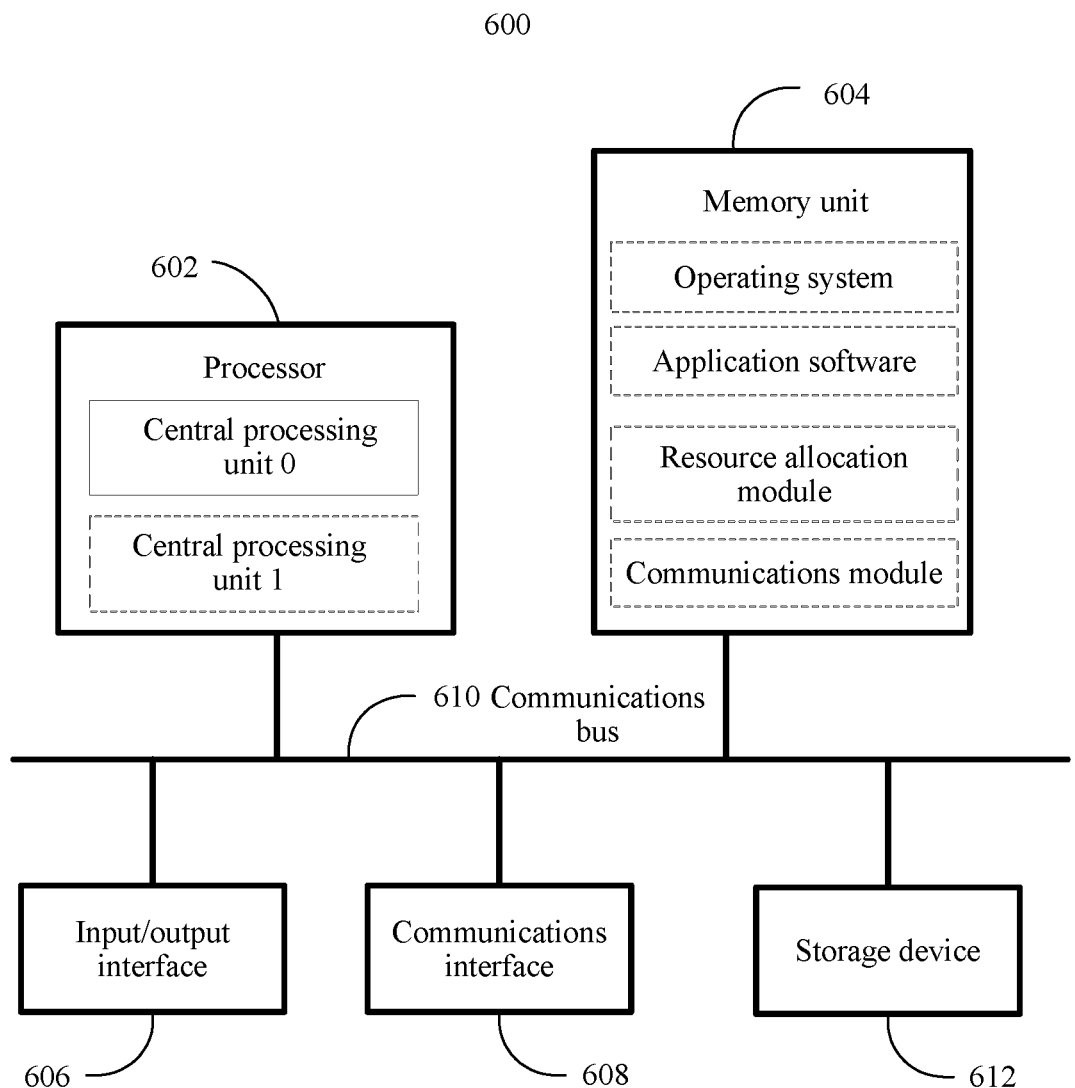
FIG. 6 is a schematic structural diagram of a general-purpose computing device according to an embodiment of the present disclosure.

A computing device 600 shown in FIG. 6 includes a processor 602, a memory unit 604, an input/output interface 606, a communications interface 608, a bus 610, and a storage device 612. The processor 602, the memory unit 604, the input/output interface 606, the communications interface 608, and the storage device 612 implement mutual communication connections by using the bus 610.

The processor 602 is a control center of the computing device 600 and configured to execute a related program, so as to implement a technical solution provided in this embodiment of the present disclosure. Optionally, the processor 602 includes one or more central processing units (Central Processing Unit, CPU), for example, a central processing unit 1 and a central processing unit 2 shown in FIG. 6. Optionally, the computing device 600 may further include multiple processors 602, and each processor 602 may be a single-core processor (including one CPU), or a multi-core processor (including multiple CPUs). The processor 602 may use a general-purpose central processing unit, a microprocessor, or use an application-specific integrated circuit (ASIC), or one or more integrated circuits.

The processor 602 may be connected to one or more storage solutions by using the bus 610. The storage solution may include the memory unit 604 and the storage device 612. The storage device 612 may be a read only memory (Read Only Memory, ROM), a static storage device, a dynamic storage device, or a random access memory (Random Access Memory, RAM). The memory unit 604 may be a random access memory. The memory unit 604 may be integrated with the processor 602 or integrated into the processor 602, or may be one or more storage units that are independent of the processor 602.

Program code to be executed by the processor 602 or a CPU inside the processor 602 may be stored in the storage device 612 or the memory unit 604. Optionally, program code stored inside the storage device 612 (such as an operating system, an application program, a resource allocation module, or a communications module) is copied to the memory unit 604 to be executed by the processor 602.

The storage device 612 may be a physical hard disk or a partition (including a small computer system interface memory or a global network block device volume) of the physical hard disk, a network storage protocol (including a network or cluster file system such as a network file system NFS), a virtual storage device based on a file (virtual disk mirroring), or a storage device based on a logical volume.

The storage device 612 may include a high-speed random access memory (RAM), and may also include a nonvolatile memory, for example, one or more disk memories, flash memories, or other nonvolatile memories. In some embodiments, the storage device may further include a remote memory separated from the one or more processors 202, such as a web disk that accesses a communications network by using the communications interface 608, and the communications network may be the Internet, an intranet, a local area network (LANs), a wide area network (WLANs), a storage area network (SANS), or a combination of the foregoing networks.

An operating system (such as Darwin, RTXC, LINUX, UNIX, OS X, WINDOWS, or an embedded operating system such as Vxworks) includes various software components and/or drivers that are configured to control and manage routine system tasks (such as memory management, storage device control, and power management) and facilitate communication between various software components and hardware components.

The input/output interface 606 is configured to receive entered data and information, and output data such as an operation result.

The communications interface 608 uses a transceiver apparatus, for example, but not limited to, a transceiver, so as to implement communication between the computing device 600 and another device or communications network.

The bus 610 may include a channel in which information is transmitted between components (such as the processor 602, the memory unit 604, the input/output interface 606, the communications interface 608, and the storage device 612) in the computing device 600. Optionally, the bus 610 may use a wired connection manner or use a wireless communication manner, and this application sets no limitation thereto.

It should be noted that for the computing device 600, only the processor 602, the memory unit 604, the input/output interface 606, the communications interface 608, the bus 610, and the storage device 612 are shown in FIG. 6. However, in a specific implementation process, persons skilled in the art should understand that the computing device 600 further includes another component required for implementing normal operation.

The computing device shown in FIG. 6 may be applied to performing the service cluster deployment method, the service cluster scheduling method, the service cluster health check method, or the service cluster traffic monitoring method provided in the embodiments of the present disclosure.

For example, the memory unit 604 of the computing device 600 includes a deployment module, and the processor 602 executes program code in the deployment module, to implement the service cluster deployment method.

For example, the memory unit 604 of the computing device 600 includes a scheduling module, and the processor 602 executes program code in the deployment module, to implement the service cluster scheduling method.

For example, the memory unit 604 of the computing device 600 includes a health check module, and the processor 602 executes program code in the deployment module, to implement the service cluster health check method.

For example, the memory unit 604 of the computing device 600 includes a traffic monitoring module, and the processor 602 executes program code in the deployment module, to implement the service cluster traffic monitoring method.

Any one of the deployment module, the scheduling module, the health check module, or the traffic monitoring module may include one or more operation instructions, so that the computing device 600 performs one or more method blocks according to the foregoing descriptions. The deployment module, the scheduling module, the health check module, or the traffic monitoring module may also be integrated into one functional module to provide a complete solution for service cluster management, such as a service cluster management functional component of an SDN controller.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for deploying a virtual machine in a software-defined data center including multiple static virtual machines, wherein the multiple static virtual machines are detected as being offline by a software defined networking (SDN) controller, the method comprising:
   obtaining, by the SDN controller in the software-defined data center, an online event from an edge switch coupled to the SDN controller, wherein the online event indicates that a virtual machine is newly online;
   determining, by the SDN controller, a media access control (MAC) address of the online virtual machine matches a MAC address of one of the multiple static virtual machines, to detect that the one of the multiple static virtual machines defined in the software-defined data center is newly online, wherein the multiple static virtual machines belong to one or more service clusters, each service cluster providing a single type of services, wherein static virtual machines within a service cluster are configured with a same Internet Protocol (IP) address;
   detecting whether the service cluster which the online virtual machine belongs to is created;
   creating a new service cluster by using a shared IP address as an identifier in response to determining that the service cluster which the online virtual machine belongs to has not been created; and
   deploying, by the SDN controller, the online virtual machine to a first service cluster in the one or more service clusters based on an IP address of the online virtual machine, wherein the IP address of the online virtual machine is identical to the IP address of static virtual machines within the first service cluster.

2. The method according to claim 1, determining, by the SDN controller, a MAC address of the online virtual machine matches a MAC address of one of multiple static virtual machines defined in the software-defined data center, comprising:
   sending, by the SDN controller, an identification request message to the online virtual machine by simulating a gateway of a candidate virtual machine, wherein the identification request message is used to instruct the online virtual machine to report the MAC address of the online virtual machine;
   receiving, by the SDN controller, a response message that is of an identification request and that is sent by the online virtual machine;
   obtaining, by the SDN controller, the MAC address of the online virtual machine carried in the response message of the identification request; and determining, by the SDN controller, that the MAC address of the online virtual machine is same as a MAC address of one of multiple static virtual machines defined in the software-defined data center.

3. The method according to claim 2, wherein the identification request message comprises an Address Resolution Protocol (ARP) request packet, and the response message of the identification request comprises an ARP response packet; and a destination MAC address in an ARP request part of the ARP request packet is padded with a special field, wherein the special field indicates that the destination MAC address is to be padded by a responding party.

4. The method according to claim 1, further comprising:
determining, by the SDN controller, whether the IP address of the online virtual machine comprised in the service cluster which the online virtual machine belongs to is invalid; and
deleting, by the SDN controller, the online virtual machine with the invalid IP address from the service cluster in response to determining that the IP address of the online virtual machine is invalid.

5. The method according to claim 4, further comprising:
initiating, by the SDN controller, a health check of the service cluster which the online virtual machine belongs to, and
determining, by the SDN controller, according to a result of the health check, whether the IP address of the online virtual machine in the service cluster which the online virtual machine belongs to is invalid.

6. The method according to claim 5, wherein the initiating the health check of the service cluster which the online virtual machine belongs to and determining whether the IP address of the online virtual machine in the service cluster which the online virtual machine belongs to is invalid comprises:
receiving, by the SDN controller, a port status event sent by an edge switch, and determining a port whose interface status is abnormal according to the port status event, so as to determine that the IP address of the online virtual machine corresponding to the port whose interface status is abnormal, is invalid.

7. The method according to claim 5, wherein the initiating the health check of the service cluster and determining whether the IP address of the online virtual machine in the service cluster which the online virtual machine belongs to is invalid comprises:
periodically sending, by the SDN controller, a link status detection request to the online virtual machine in the service cluster which the online virtual machine belongs to; and
monitoring whether a response message that is of the link status detection request and that is returned by the online virtual machine in the service cluster which the online virtual machine belongs to is received within a preset time, so as to determine that the IP address of the online virtual machine encountering response message timeout is invalid.

8. The method according to claim 5, wherein the initiating, by the SDN controller and determining whether the IP address of the online virtual machine in the service cluster which the online virtual machine belongs to is invalid comprises:
receiving, by the SDN controller, an aging forwarding flow table event sent by at least one edge switch, so as to determine that the IP address of the online virtual machine corresponding to an aging forwarding flow table is invalid.

9. A software defined networking (SDN) controller of a software-defined data center being virtualized on at least a computing device, the computing device comprising:
a processor;
a bus; and
a memory configured to store an executable instruction, wherein the processor and the memory are connected via the bus and wherein the processor executes the executable instruction stored in the memory to cause the SDN controller to perform operations comprising:
obtaining an online event from an edge switch, wherein the online event indicates that a virtual machine is newly online;
determining a media access control (MAC) address of the online virtual machine matches a MAC address of one of multiple static virtual machines defined in the software-defined data center, to detect that the one of the multiple static virtual machines defined in the software-defined data center is newly online, wherein each static virtual machine is configured with an Internet Protocol (IP) address and a Media Access Control (MAC) address, and the multiple static virtual machines belong to one or more service clusters, each service cluster providing a single type of services, wherein static virtual machines within a service cluster are configured with a same IP address;
detecting whether the service cluster which the online virtual machine belongs to is created;
creating a new service cluster by using a shared IP address as an identifier in response to determining that the service cluster which the online virtual machine belongs to has not been created; and
deploying the online virtual machine to a first service cluster in the one or more service clusters based on an IP address of the online virtual machine, wherein the IP address of the online virtual machine is identical to the IP address of static virtual machines within the first service cluster.

10. The SDN controller according to claim 9, wherein the processor executes the executable instruction stored in the memory to perform operations further comprising: sending an identification request message to the online virtual machine by simulating a gateway of a candidate virtual machine, wherein the identification request message is used to instruct the online virtual machine to report the MAC address of the online virtual machine, receiving a response message that is of an identification request and that is sent by the online virtual machine, obtain the MAC address of the online virtual machine carried in the response message of the identification request, determining that the MAC address of the online virtual machine is same as a MAC address of one of multiple static virtual machines defined in the software-defined data center.

11. The SDN controller according to claim 9, the processor executes the executable instruction stored in the memory to perform operations further comprising: determining whether an IP address of the online virtual machine comprised in the service cluster which the online virtual machine belongs to is invalid and delete, from the service cluster which the online virtual machine belongs to, the online virtual machine with the invalid IP address in response to determining that the IP address of the online virtual machine is invalid.

12. The SDN controller according to claim 11, wherein the processor executes the executable instruction stored in the memory to perform operations further comprising: initiating a health check of the service cluster, and determine, according to a result of the health check, whether the IP address of the online virtual machine in the service cluster which the online virtual machine belongs to is invalid.

13. The SDN controller according to claim 12, wherein the processor executes the executable instruction stored in the memory to perform operations further comprising:
receiving a port status event sent by at least one edge switch, and determining a port whose interface status is abnormal according to the port status event, so as to determine that the IP address of the online virtual machine corresponding to the port whose interface status is abnormal is invalid.

14. The SDN controller according to claim 12, wherein the processor executes the executable instruction stored in the memory to perform operations further comprising:
periodically sending a link status detection request to the online virtual machine in the service cluster which the online virtual machine belongs to, and monitoring whether a response message that is of the link status detection request and that is returned by the online virtual machine in the service cluster which the online virtual machine belongs to is received within a preset time, so as to determine that the IP address of the online virtual machine encountering response message timeout is invalid.

15. The SDN controller according to claim 12, wherein the processor executes the executable instruction stored in the memory to perform operations further comprising:
receiving an aging forwarding flow table event sent by an edge switch, so as to determine that the IP address of the online virtual machine corresponding to an aging forwarding flow table is invalid.

16. A non-transitory machine-readable medium having instructions stored therein, which when executed by a processor, cause the processor to perform a method for deploying a virtual machine in a software-defined data center including multiple static virtual machines, wherein the multiple static virtual machines are detected as being offline by a software defined networking (SDN) controller, the method comprising:
obtaining, by the SDN controller in the software-defined data center, an online event from an edge switch coupled to the SDN controller, wherein the online event indicates that a virtual machine is newly online;
determining, by the SDN controller, a media access control (MAC) address of the online virtual machine matches a MAC address of one of the multiple static virtual machines, to detect that the one of the multiple static virtual machines defined in the software-defined data center is newly online, wherein the multiple static virtual machines belong to one or more service clusters, each service cluster providing a single type of services, wherein static virtual machines within a service cluster are configured with a same Internet Protocol (IP) address;
detecting whether the service cluster which the online virtual machine belongs to is created;
creating a new service cluster by using a shared IP address as an identifier in response to determining that the service cluster which the online virtual machine belongs to has not been created; and
deploying, by the SDN controller, the online virtual machine to a first service cluster in the one or more service clusters based on an IP address of the online virtual machine, wherein the IP address of the online virtual machine is identical to the IP address of static virtual machines within the first service cluster.

17. The machine-readable medium according to claim 16, determining, by the SDN controller, a MAC address of the online virtual machine matches a MAC address of one of multiple static virtual machines defined in the software-defined data center, comprising:
sending, by the SDN controller, an identification request message to the online virtual machine by simulating a gateway of a candidate virtual machine, wherein the identification request message is used to instruct the online virtual machine to report the MAC address of the online virtual machine;
receiving, by the SDN controller, a response message that is of the identification request and that is sent by the online virtual machine;
obtaining, by the SDN controller, the MAC address of the online virtual machine carried in the response message of an identification request; and
determining, by the SDN controller, that the MAC address of the online virtual machine is same as a MAC address of one of multiple static virtual machines defined in the software-defined data center.

18. The machine-readable medium according to claim 17, wherein the identification request message comprises an Address Resolution Protocol (ARP) request packet, and the response message of the identification request comprises an ARP response packet; and a destination MAC address in an ARP request part of the ARP request packet is padded with a special field, wherein the special field indicates that the destination MAC address is to be padded by a responding party.

* * * * *